United States Patent
Hayes et al.

(10) Patent No.: US 8,947,061 B2
(45) Date of Patent: Feb. 3, 2015

(54) HYSTERETIC SWITCHING REGULATOR WITH REDUCED SWITCHING FREQUENCY VARIATION

(75) Inventors: Eric Martin Hayes, Fort Collins, CO (US); Ryan Desrosiers, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 704 days.

(21) Appl. No.: 13/045,333

(22) Filed: Mar. 10, 2011

(65) Prior Publication Data

US 2012/0229105 A1 Sep. 13, 2012

(51) Int. Cl.
*H02M 3/156* (2006.01)

(52) U.S. Cl.
CPC .................................. *H02M 3/1563* (2013.01)
USPC ....................................................... 323/282

(58) Field of Classification Search
USPC ......... 323/271, 282, 284, 285, 286, 288, 299, 323/300, 901, 908
See application file for complete search history.

(56) References Cited

U.S. PATENT DOCUMENTS

| | | | | |
|---|---|---|---|---|
| 5,982,160 A * | 11/1999 | Walters et al. | ................ | 323/282 |
| 7,109,693 B2 * | 9/2006 | Yoshida et al. | ................ | 323/282 |
| 7,315,153 B2 * | 1/2008 | Tazawa et al. | ................ | 323/272 |
| 7,358,710 B2 * | 4/2008 | Luo et al. | ....................... | 323/282 |
| 8,198,857 B2 * | 6/2012 | De Cremoux | ................ | 320/107 |
| 2008/0284396 A1 * | 11/2008 | Hata et al. | ..................... | 323/282 |
| 2009/0134857 A1 * | 5/2009 | Zeng et al. | .................... | 323/282 |
| 2010/0134085 A1 * | 6/2010 | Nishida | ........................ | 323/285 |

* cited by examiner

*Primary Examiner* — Gary L Laxton
*Assistant Examiner* — Afework Demisse
(74) *Attorney, Agent, or Firm* — Sterne, Kessler, Goldstein & Fox P.L.L.C.

(57) ABSTRACT

Embodiments of a hysteretic switching regulator with reduced switching frequency variation over changes in one or more of input voltage, output voltage, and temperature are provided herein. A frequency adjust controller is specifically used to adjust a parameter of an integrator within the hysteretic switching regulator to compensate for changes in one or more of input voltage, output voltage, and temperature to maintain the switching frequency of the regulator within a narrow frequency range. Limiting the potentially wide switching frequency variation makes filtering of electromagnetic interference (EMI) caused by the switching action of the hysteretic switching regulator more effective and simpler to implement.

21 Claims, 7 Drawing Sheets

FIG. 7

HYSTERETIC SWITCHING REGULATOR WITH REDUCED SWITCHING FREQUENCY VARIATION

FIELD OF THE INVENTION

This application relates generally to switching regulators. More particularly, this application relates to hysteretic switching regulators with control systems to reduce switching frequency variation.

BACKGROUND

Switching regulators are designed to provide a regulated output voltage from an unregulated input voltage. They are frequently implemented in battery powered electronic devices to regulate the battery output voltage which, when charged or discharged, can be greater than, less than, or substantially the same as the desired output voltage.

Figure 1:
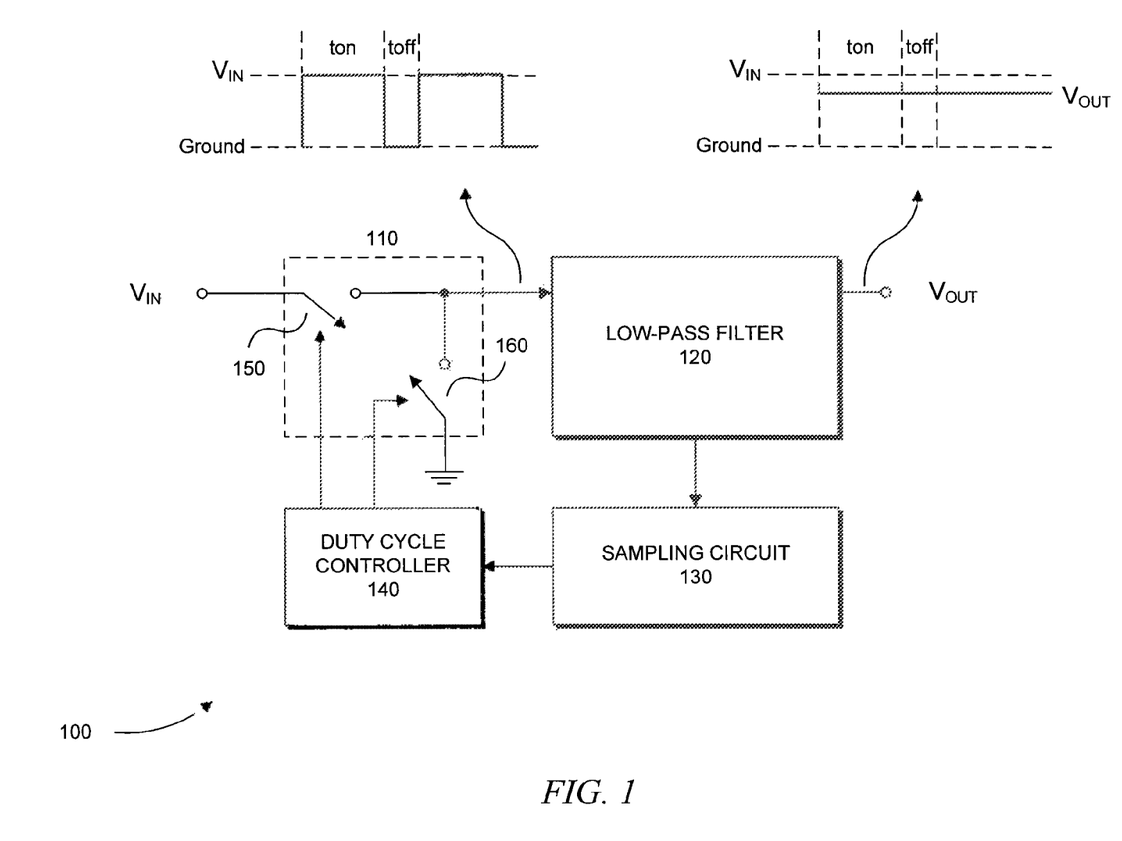
FIG. 1 illustrates a buck switching regulator.

In general, a switching regulator works by periodically transferring small amounts of energy from the input voltage source to the output. This is accomplished with the help of one or more power switches and a controller which regulates the rate at which energy is transferred to the output. FIG. 1 illustrates a buck switching regulator 100 that works in this general manner to step-down an input voltage $V_{IN}$ to provide a regulated output voltage $V_{OUT}$. Buck switching regulator 100 includes a power switch module 110, a low-pass filter 120, a sampling circuit 130, and a duty cycle controller 140.

In the step-down regulator of FIG. 1, the basic circuit operation is to close switch 150 for a time $t_{ON}$ and then open it for a time $t_{OFF}$. The total on and off time of switch 150 is referred to as the switching period T. Switch 160 is controlled in the opposite manner as switch 150 and is off while switch 150 is on, and on while switch 150 is off. Thus, ignoring any voltage drop across switches 150 and 160, the voltage at the input to filter 120 is $V_{IN}$ during the time $t_{ON}$ and ground or zero during the time $t_{OFF}$.

With switches 150 and 160 turning on and off, high-frequency voltage pulses are applied at the input of low pass filter 120 and an averaged DC level comes out as $V_{OUT}$. By altering the ratio of the on time of switch 150 to the switching period, the averaged DC level of $V_{OUT}$ can be changed.

Duty cycle controller 140 is configured to adjust the ratio of the on time of switch 150 to the switching period in accordance with a feedback signal provided by sampling circuit 130. The feedback signal is related to the difference between $V_{OUT}$ and a reference voltage equal to a desired value of $V_{OUT}$. The ratio of the on time of switch 150 to the switching period is altered as needed by duty cycle controller 140 to regulate the output voltage $V_{OUT}$ at the desired level.

There are several different topologies for implementing duty cycle controller 140. Depending on the topology, the ratio of the on time of switch 150 to the switching period (i.e., the duty cycle) can be altered in a number of ways. The two most common approaches are pulse-width modulation (PWM) and variable frequency. In PWM based control topologies, the switching period is fixed and the on time of switch 150 is varied. Conversely, in variable frequency control topologies, the switching period is not fixed and changes as the on time and/or off time of switch 150 is varied.

Hysteretic switching regulators are one type of switching regulator based on a variable frequency control topology. These switching regulators have several advantages over switching regulators based on PWM control topologies. For example, unlike switching regulators based on PWM control topologies, hysteretic switching regulators do not require an oscillator and therefore are generally simpler to implement.

However, the potentially wide switching frequency variation of hysteretic switching regulators during operation makes it difficult and expensive to filter electromagnetic interference (EMI) caused by the switching action, which can interfere with sensitive RF components near and powered by the regulator.

Therefore, what is needed is a hysteretic switching regulator with reduced switching frequency variation.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. HYSTERETIC SWITCHING REGULATOR WITH WIDE SWITCHING FREQUENCY VARIATION

Figure 2:
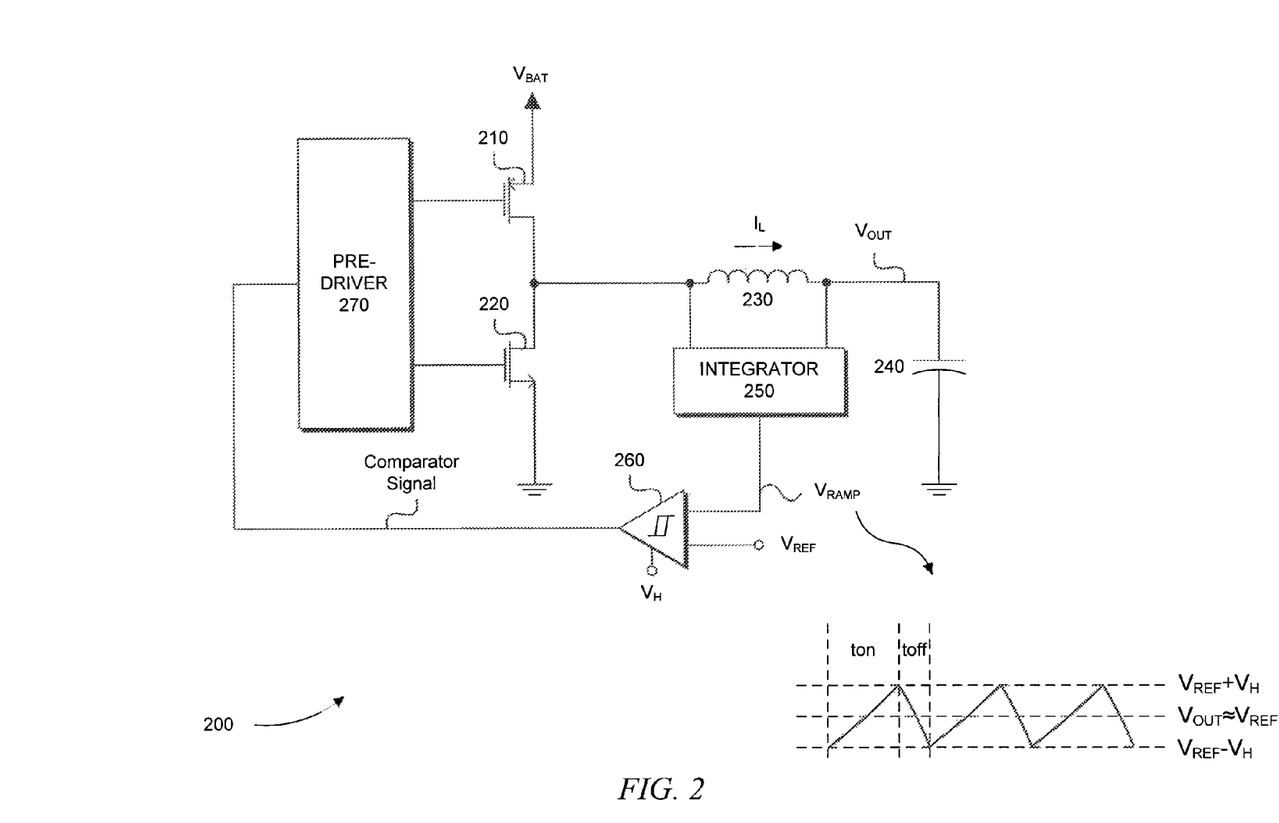
FIG. 2 illustrates a hysteretic switching regulator with a wide switching frequency variation.

FIG. 2 illustrates a hysteretic switching regulator 200 that is configured to step-down an unregulated battery voltage $V_{BAT}$ to provide a regulated output voltage $V_{OUT}$. Hysteretic switching regulator 200 includes a first power switch 210, a second power switch 220, an inductor 230, a capacitor 240, an integrator 250, a hysteretic comparator 260, and a pre-driver module 270. Power switches 210 and 220 form a power switch module, and inductor 230 and capacitor 240 form a low pass filter.

At a high-level, pre-driver module 270 receives a comparator signal from hysteretic comparator 260 and drives power switches 210 and 220 with sufficient strength to turn them on and off as directed by the comparator signal (only one power switch is on at any given time). In general, the comparator signal controls the configuration and timing of power switches 210 and 220 to regulate the flow of power from the source providing unregulated input voltage $V_{BAT}$ to the low pass filter formed by inductor 230 and capacitor 240. The low pass filter converts the switched voltage pulses, produced by the switching action of switches 210 and 220, into a steady current and regulated output voltage $V_{OUT}$.

To maintain $V_{OUT}$ at a desired value, hysteretic comparator measures the voltage across inductor 230 and uses this measured voltage as a feedback signal indicative of the output voltage $V_{OUT}$. Integrator 250 is specifically responsible for measuring the voltage across inductor 230 and superimposing this measured signal on top of $V_{OUT}$ to provide feedback signal $V_{RAMP}$. The signal $V_{RAMP}$ is then representative of the current $I_L$ flowing through the inductor.

Hysteretic comparator 260 maintains $V_{OUT}$ at a desired value $V_{REF}$ by comparing $V_{RAMP}$ to $V_{REF}$. When $V_{RAMP}$ becomes less than $V_{REF}-V_H$, where $V_H$ is the hysteresis of hysteretic comparator 260, the comparator signal transitions to a logical high level, signaling to pre-driver module 270 to turn on switch 210 for a period of time $t_{ON}$ sufficient to raise $V_{RAMP}$ back up to $V_{REF}+V_H$. During $t_{ON}$, the battery voltage $V_{BAT}$ is coupled to one end of inductor 230 (ignoring any voltage drop across switch 210) and the output voltage $V_{OUT}$ is coupled to the other end. Thus, the voltage across inductor 230 is equal to $V_{BAT1}-V_{OUT}$ and $V_{RAMP}$ increases linearly at a rate proportional to $(V_{BAT}-V_{OUT})/L$.

Once $V_{RAMP}$ becomes greater than $V_{REF}+V_H$, the comparator signal transitions to a logical low level, signaling to pre-driver module 270 to turn off switch 210 and turn on switch 220 for a period of time $t_{OFF}$ until $V_{RAMP}$ again falls below $V_{REF}-V_H$, at which time the process described above is repeated. During $t_{ON}$, inductor 230 is coupled to ground (ignoring any voltage drop across switch 220) at one end and $V_{OUT}$ at the other. Thus, the voltage across inductor 230 is equal to $-V_{OUT}$, and $V_{RAMP}$ decreases linearly at a rate proportional to $-V_{OUT}/L$.

The turning on and off of switches 210 and 220 by the comparator signal causes $V_{RAMP}$ to oscillate slightly above and below $V_{REF}$ with a ripple voltage determined primarily by the hysteresis band of hysteretic comparator 260. This is illustrated by the exemplary waveform diagram of $V_{RAMP}$ in the lower right hand corner of FIG. 2. If the capacitance of capacitor 240 is large enough, $V_{OUT}$ should not significantly change while switches 210 and 220 turn on and off and should be maintained at $V_{REF}$.

By analyzing the current $I_L$ through inductor 230, a relationship between Vout and $V_{BAT}$ and the duty cycle of the drive signal controlling switches 210 and 220 can be seen. Specifically, when switch 210 is on and switch 220 is off, the voltage across inductor 230 is equal to $V_{BAT}-V_{OUT}$ (ignoring any voltage drop across switch 210) and the current $I_L$ through inductor 230 increases linearly during the time $t_{ON}$ that switch 210 is on. The following equation describes the change in $I_L$ while switch 210 is on:

$$\frac{V_{BAT} - V_{OUT}}{L} * t_{ON} = \Delta I_L \qquad (1)$$

When switch 210 is off and switch 220 is on, the voltage across inductor 230 is equal to $-V_{OUT}$ (ignoring any voltage drop across switch 220) and the current $I_L$ through inductor 230 decreases linearly during the time $t_{OFF}$ that switch 210 is off. The following equation describes the change in $I_L$ while switch 210 is off:

$$\frac{-V_{OUT}}{L} * t_{OFF} = \Delta I_L \qquad (2)$$

If we assume steady state conditions exist and $I_L$ never goes to zero, then the change in $I_L$ during the time $t_{ON}$ is equal and opposite to the change in $I_L$ during the time $t_{OFF}$, and equations (1) and (2) can be set equal. By setting equations (1) and (2) equal, a basic relationship between $V_{BAT}$ and $V_{OUT}$ can be derived. This basic relationship is given by the following equation:

$$V_{OUT} = V_{BAT} \frac{t_{ON}}{t_{ON} + t_{OFF}} = V_{BAT} * D \qquad (3)$$

where D is the duty cycle. Thus, as can be seen from equation (3), $V_{OUT}$ is generally dependent and determined by $V_{BAT}$ and the duty cycle D, and is generally not dependent on the switching frequency $f_{SW}$ given by $1/(t_{ON}+t_{OFF})$.

Although the output voltage $V_{OUT}$ is generally not dependent on the switching frequency $f_{SW}$ of switches 210 and 210, the rate at which switches 210 and 220 turn on and off is still an important design consideration. In particular, the rate at which switches 210 and 220 turn on and off is still an important design consideration because the on-off switching produces noise that can interfere with sensitive RF components near and powered by the regulator.

Although filtering can be employed to reduce this noise, in hysteretic switching regulators, the switching frequency is not constant and can vary widely during operation. This potentially wide variation in switching frequency makes it difficult and expensive to filter electromagnetic interference (EMI) caused by the switching action of hysteretic switching regulators, such as hysteretic switching regulator 200.

It can be shown that the switching frequency $f_{SW}$ of hysteretic switching regulator 200, as controlled by the comparator signal, is approximately given by:

$$f_{SW} = \frac{V_{OUT}}{V_{BAT} * t_{DLY} + H * k} \qquad (4)$$

where H is the magnitude of the hysteresis band associated with hysteretic comparator 260 (i.e., $2*V_H$), k is a circuit parameter of integrator 250 related to the rate at which the output signal $V_{RAMP}$ changes for a given voltage across inductor 230, and $t_{DLY}$ is the combined propagation delay of one or more components of hysteretic switching regulator 200 (e.g., hysteretic comparator 260 and pre-driver module 270). In normal operation of hysteretic switching regulator 200, $t_{DLY}$, H, and k generally do not vary that much (at least when temperature is assumed constant). However, the battery voltage $V_{BAT}$, as it is being charged and discharged, can vary significantly.

Figure 3:
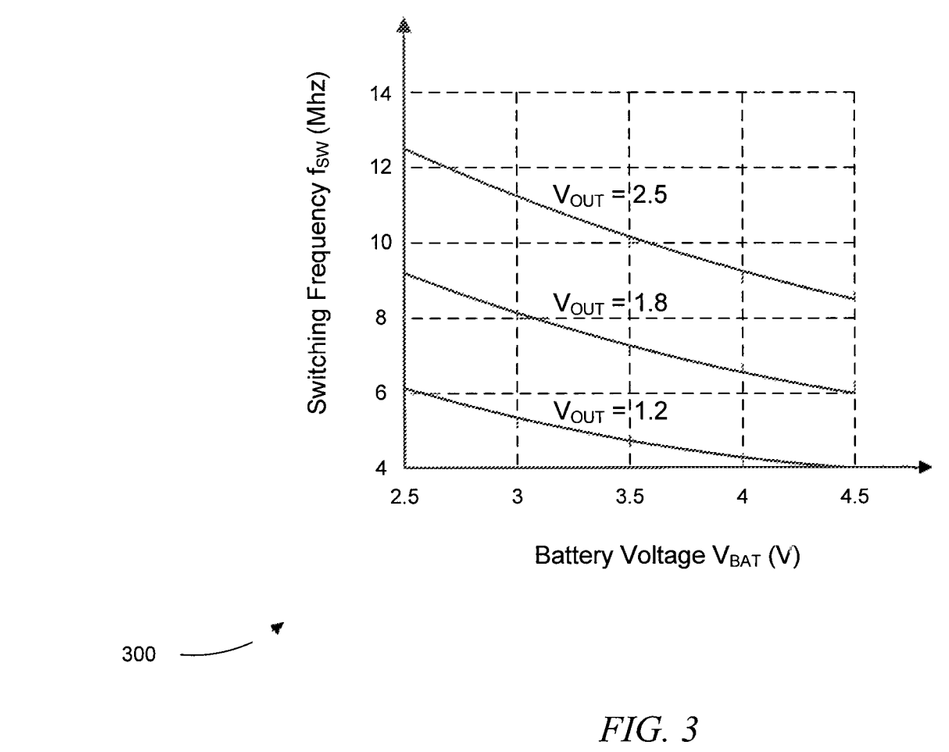
FIG. 3 illustrates an exemplary plot of switching frequency versus input (battery) voltage for the hysteretic switching regulator of FIG. 2.

FIG. 3 illustrates an exemplary plot 300 of switching frequency $f_{SW}$ versus battery (input) voltage $V_{BAT}$ for three different output voltages: 2.5 V, 1.8 V, and 1.2 V. As can be seen from plot 300 illustrated in FIG. 3, the switching frequency $f_{SW}$ of hysteretic switching regulator 200 varies widely over both the battery voltage $V_{BAT}$ and the output voltage $V_{OUT}$. More specifically, and in at least one exemplary implementation of hysteretic switching regulator 200, the switching frequency $f_{SW}$ decreases as the battery voltage $V_{BAT}$ increases and, for a given battery voltage $V_{BAT}$, the switching frequency $f_{SW}$ is greater for larger values of output voltage $V_{OUT}$.

Embodiments of the present invention, as will be discussed further below, are directed to hysteretic switching regulators with reduced switching frequency variation over changes in one or more of input voltage, output voltage, and temperature of the switching regulator.

2. HYSTERETIC SWITCHING REGULATOR WITH REDUCED SWITCHING FREQUENCY VARIATION

Figure 4:
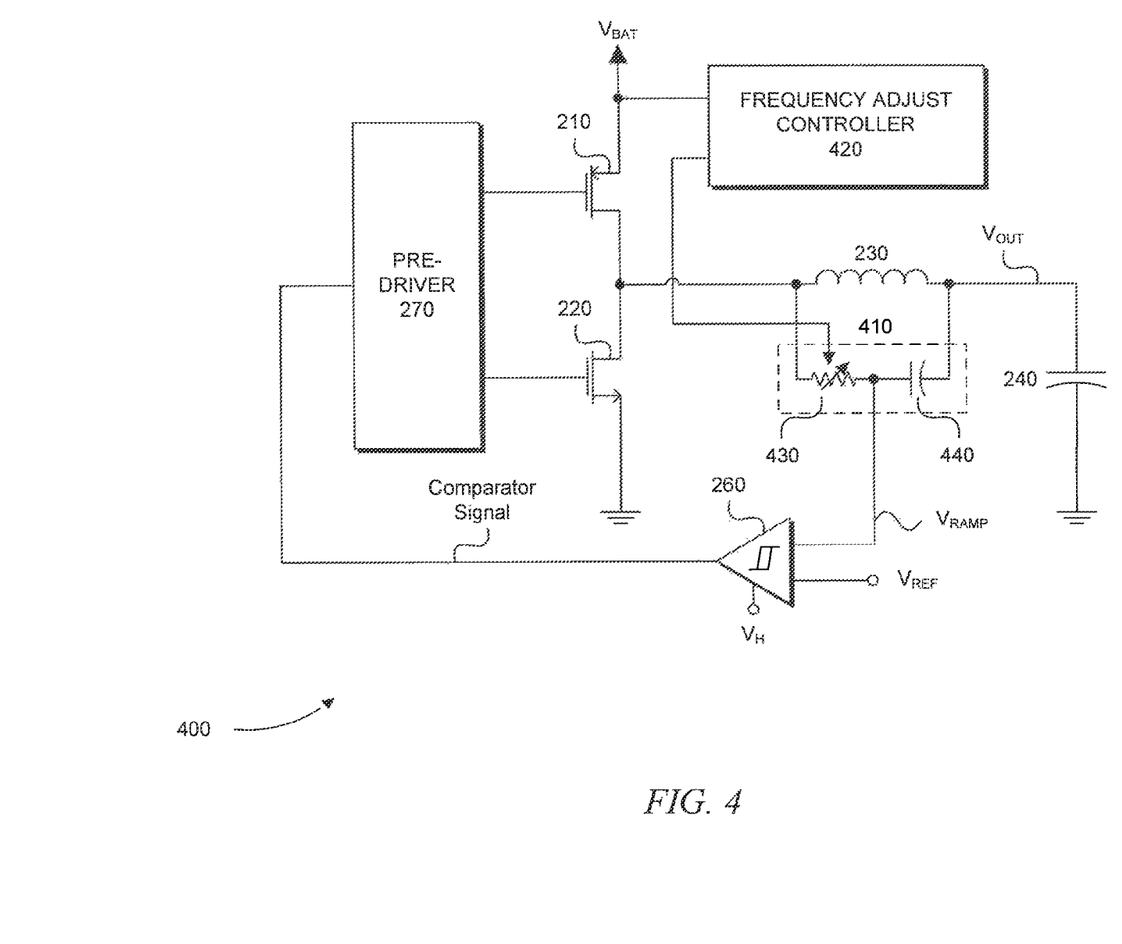
FIG. 4 illustrates a hysteretic switching regulator with reduced switching frequency variation, according to embodiments of the present invention.

FIG. 4 illustrates a hysteretic switching, regulator 400 with reduced switching frequency variation, according to embodiments of the present invention. As illustrated in FIG. 4, hysteretic switching regulator 400 includes a substantially similar structure as hysteretic switching regulator 200, illustrated in FIG. 2. However, hysteretic switching regulator 400 illustrates an exemplary embodiment of an integrator 410 and further includes a frequency adjust controller module 420.

In operation, hysteretic switching regulator 400 works in the same general manner as described above in regard to hysteretic switching regulator 200 to maintain output voltage $V_{OUT}$ at a desired value $V_{REF}$. However, during the course of operation, frequency adjust controller 420 is configured to measure the voltage of the unregulated input voltage source, which in the exemplary embodiment illustrated in FIG. 4 is $V_{BAT}$ provided by a battery, and adjust one or more circuit parameters associated with integrator 410 in response to changes in this measured value.

As noted above, it can be shown that the switching frequency $f_{SW}$ of hysteretic switching regulator 400 is approximately given by:

$$f_{SW} = \frac{V_{OUT}}{V_{BAT} * t_{DLY} + H * k} \quad (5)$$

where H is the magnitude of the hysteresis band associated with hysteretic comparator 260 (i.e., $2*V_H$), k is a circuit parameter of integrator 410 related to the rate at which the output signal $V_{RAMP}$ changes for a given voltage across inductor 230, and $t_{DLY}$ is the combined propagation delay of one or more components of hysteretic switching regulator 400. From equation (5) it is readily apparent that the switching frequency $f_{SW}$ changes with the battery voltage $V_{BAT}$. Frequency controller module 420 is configured to adjust the circuit parameter k, associated with integrator 410, to compensate for changes in battery voltage $V_{BAT}$ to substantially maintain the switching frequency $f_{SW}$ within a narrow frequency range (e.g., +/−50 kHz around a pre-determined frequency). In particular, and at least for the exemplary implementation of hysteretic switching regulator 400, as the battery voltage $V_{BAT}$ decreases the circuit parameter k can be increased, and as the battery voltage $V_{BAT}$ increases the circuit parameter k can be decreased.

In one embodiment, frequency adjust controller 410 is specifically configured to measure $V_{BAT}$ and determine a desired setting for the circuit parameter k of integrator 410, based on the measured value of $V_{BAT}$, to maintain the switching frequency $f_{SW}$ within the narrow frequency range. After determining the desired value of circuit parameter k, the actual circuit parameter k of integrator 410 can be adjusted if necessary.

In another embodiment, frequency adjust controller 410 is configured to determine a setting for the circuit parameter k of integrator 410 based on which of several different possible voltage ranges the measured value of $V_{BAT}$ falls within. For example, if the measured value of $V_{BAT}$ falls within a first voltage range (e.g., 1.8V-2.4V), then frequency adjust controller 410 can set or adjust circuit parameter k to a first value. If, however, the measured value of $V_{BAT}$ falls within a second voltage range (e.g., 2.4V-2.8V), then frequency adjust controller 410 can set or adjust circuit parameter k to a second value. In general, the one or more voltage ranges can span any reasonable distance and a value of the circuit parameter k can be determined for each voltage range to maintain the switching frequency $f_{SW}$ within the narrow frequency range.

In one embodiment, and as illustrated in FIG. 4, integrator 410 includes a variable resistor 430 and a capacitor 440. The series combination of variable resistor 430 and capacitor 440 across inductor 230 forms a low pass filter that approximates an integration function responsible for "integrating" the voltage across inductor 230. In the specific embodiment of integrator 410 illustrated in FIG. 4, the circuit parameter k corresponds to the resistance parameter of resistor 430 multiplied by the capacitance parameter of capacitor 440 and is related to the rate at which the output signal $V_{RAMP}$ changes for a given voltage across inductor 230. In general, the resistance parameter and/or the capacitance parameter of integrator 440 can be adjusted by frequency adjust controller 420 during operation to maintain the switching frequency $f_{SW}$ within the narrow frequency range. In practice, however, it is often easier to adjust the resistance parameter of resistor 430.

It should be noted that the series combination of resistor 430 and capacitor 440 represents only one possible implementation of integrator 410. Other implementations of integrator 410 are possible without departing from the scope and spirit of the present invention as would be appreciated by one of ordinary skill in the art. For example, a series inductor-resistor combination can be used in place of the series resistor-capacitor combination illustrated in FIG. 4.

It should be further noted that frequency adjust controller 420 can be implemented within any reasonable hysteretic switching regulator topology without departing from the scope and spirit of the present invention as would be appreciated by one of ordinary skill in the art. For example, frequency adjust controller 420 can be implemented within a boost or buck-boost hysteretic switching regulator to adjust a circuit parameter k associated with an integrator to maintain the switching frequency $f_{SW}$ within the narrow frequency range. In addition, frequency adjust controller 420 can be implemented within hysteretic switching regulators with power switches that have been implemented using JFET or BJT devices, or even a diode, rather than the FET devices as illustrated in FIG. 4. Even further, frequency adjust controller 420 can be implemented within hysteretic switching regulators that utilize one or more additional components, such as a non-overlap generation circuit to ensure switches 210 and 220 are never on at the same time and an over current detection circuit.

Figure 5:
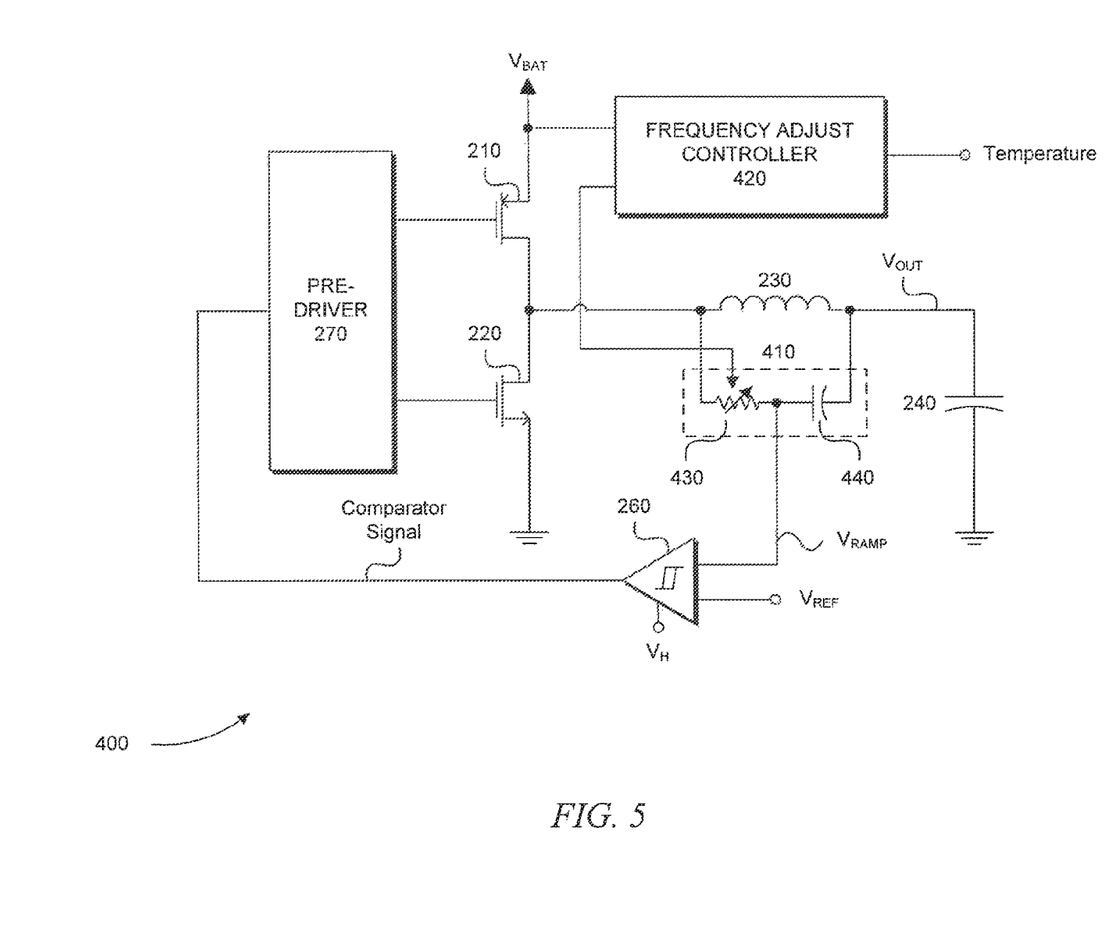
FIG. 5 illustrates a variant of the hysteretic switching regulator with reduced switching frequency illustrated in FIG. 4, according to embodiments of the present invention.

Referring now to FIG. 5, a variant of hysteretic switching regulator 400, according to embodiments of the present invention, is illustrated. In particular, the operating temperature of switching regulator 400 is further measured and/or received by frequency adjust controller 420 and used by frequency adjust controller 420 to adjust the circuit parameter k of integrator 410 to maintain the switching frequency $f_{SW}$ within a narrow frequency range. In general, it can be shown that the switching frequency $f_{SW}$ of switching regulator 400 is further affected by second order effects, such as changes in operating temperature, in addition to changes in the battery voltage $V_{BAT}$.

In one embodiment, frequency adjust controller 410 is configured to measure $V_{BAT}$ and the operating temperature to determine a desired setting for the circuit parameter k of integrator 410 to maintain the switching frequency $f_{SW}$ within the narrow frequency range. After determining the desired value of circuit parameter k for the measured battery voltage $V_{BAT}$ and operating temperature, the actual circuit parameter k of integrator 410 can be adjusted if necessary.

In another embodiment, frequency adjust controller 410 is configured to determine a setting for the circuit parameter k of integrator 410 based on which of several different possible voltage ranges and temperature ranges the current measured values of $V_{BAT}$ and the temperature falls within. For example, if the measured value of $V_{BAT}$ falls within the voltage range of 1.8 V-2.4V and the measured temperature falls within the range of 75-85 degrees Fahrenheit, then frequency adjust controller 410 can set or adjust circuit parameter k to a first value. If, however, the measured value of $V_{BAT}$ falls within the voltage range of 1.8V-2.4V and the measured temperature falls within the range of 85-105 degrees Fahrenheit, then frequency adjust controller 410 can set or adjust circuit parameter k to a second value. In general, the one or more battery voltage and temperature ranges can span any reasonable distance and a value of the circuit parameter k can be determined for each combination of battery voltage range and temperature range to maintain the switching frequency $f_{SW}$ within the narrow frequency range.

Figure 6:
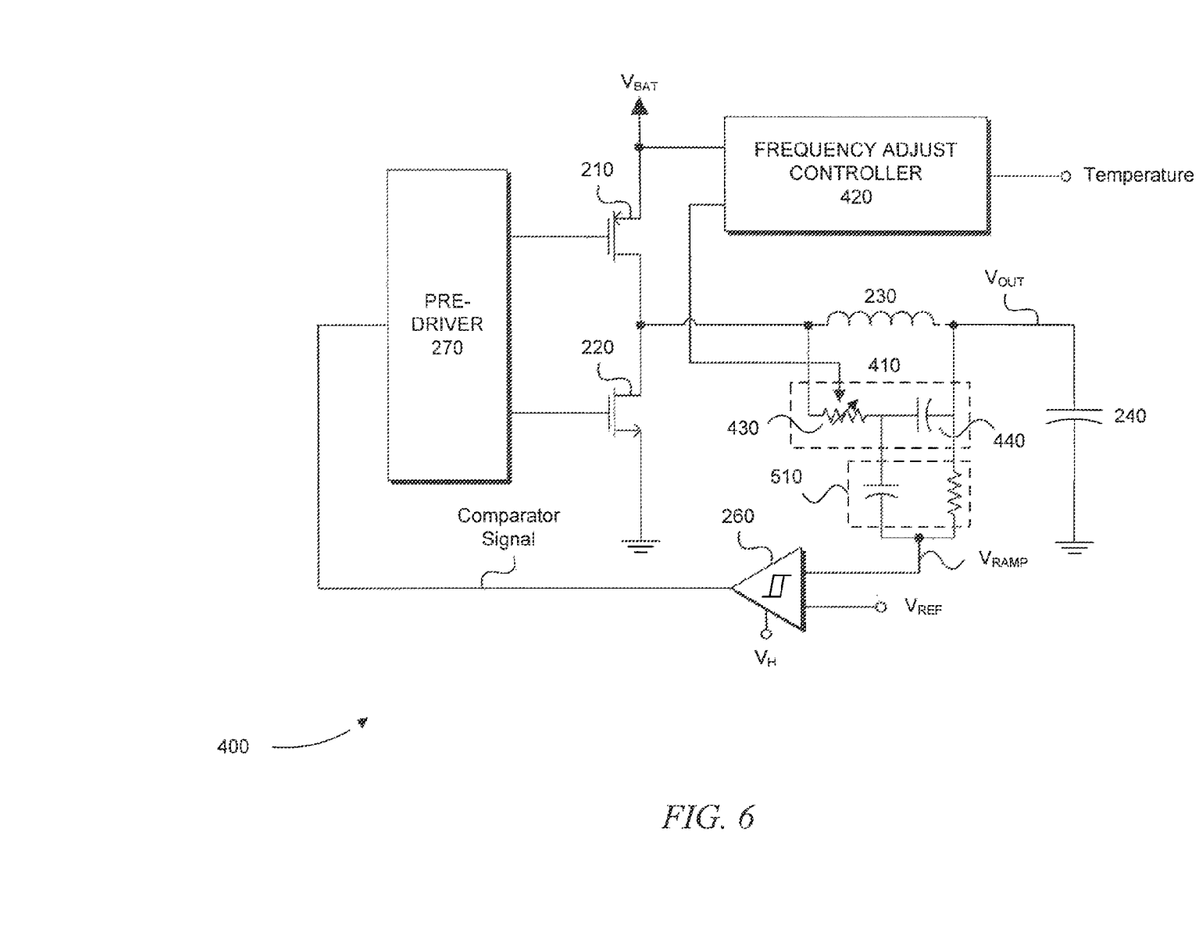
FIG. 6 illustrates a further variant of the hysteretic switching regulator with reduced switching frequency illustrated in FIG. 4, according to embodiments of the present invention.

FIG. 6 illustrates a further variant of hysteretic switching regulator 400 according to embodiments of the present invention. In particular, hysteretic switching regulator 400 illustrated in FIG. 6 has been modified to include a low pass filter 510 to increase the DC gain of $V_{RAMP}$.

Figure 7:
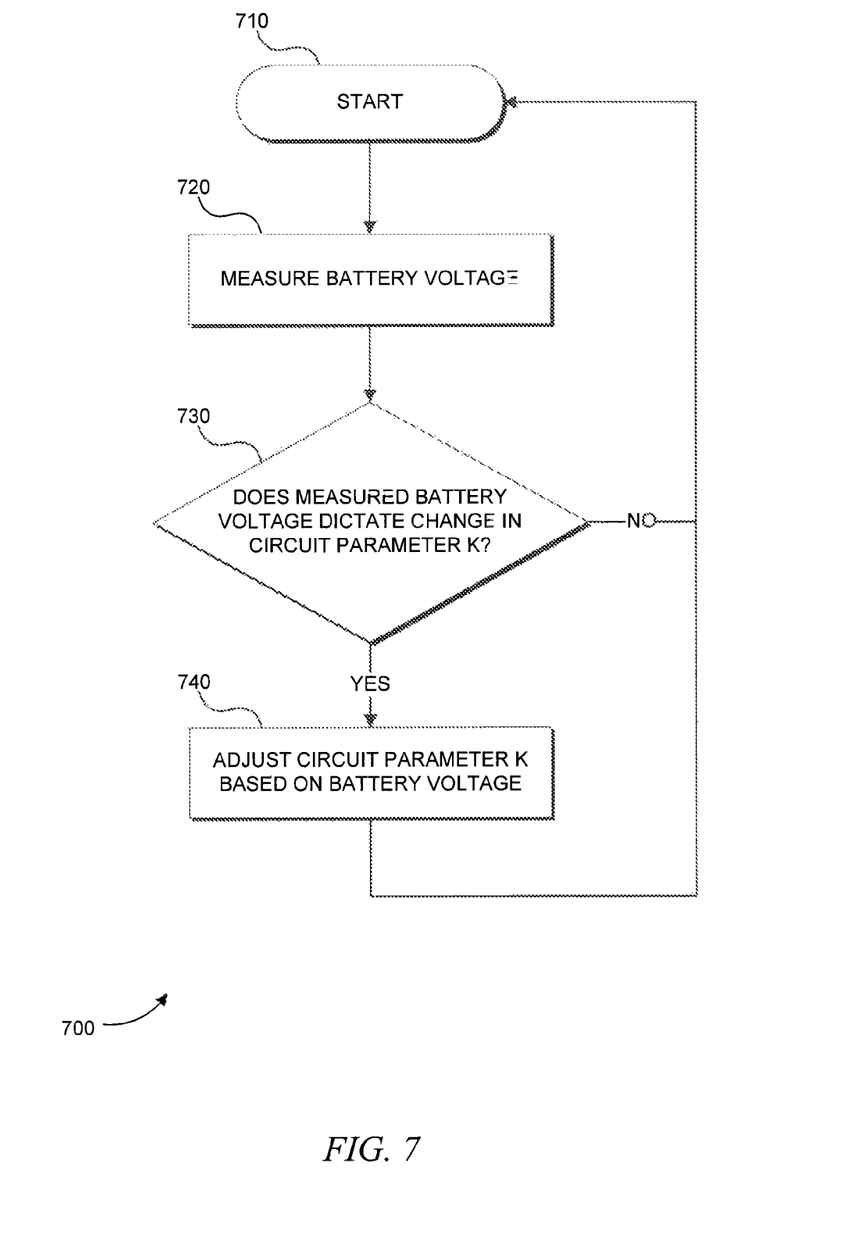
FIG. 7 illustrates a method for reducing switching frequency variation in a hysteretic switching regulator, according to embodiments of the present invention.

FIG. 7 illustrates an exemplary method 700 for reducing switching frequency variation in a hysteretic switching regulator, according to embodiments of the present invention. Method 700 is described below with specific reference to FIG. 4.

Method 700 starts at step 710 and immediately transitions to step 720. At step 720, the battery voltage $V_{BAT}$ is measured by frequency adjust controller 420 and method 700 transitions to step 730.

At step 730, a determination is made by frequency adjust controller 420 as to whether the measured battery voltage (and possibly measured temperature) dictates a change in the circuit parameter k of integrator 410. Frequency adjust controller 420 is specifically configured to determine a desired setting for the circuit parameter k of integrator 410, based on the measured value of $V_{BAT}$, to maintain the switching frequency $f_{SW}$ within a narrow frequency range.

If the actual circuit parameter k of integrator 410 is already at the desired value to maintain the switching frequency $f_{SW}$ within the narrow frequency range, method 700 transitions back to step 710 and the process is repeated.

If, on the other hand, the actual circuit parameter k of integrator 410 is not already at the desired value to maintain the switching frequency $f_{SW}$ within the narrow frequency range, method 700 transitions to 740 where the circuit parameter is adjusted accordingly. After step 740 completes, method 700 transitions back to step 710 and the process is repeated.

In one embodiment, process 700 is repeated after a set delay or after a pre-determined period of time has expired.

3. CONCLUSION

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A hysteretic switching regulator with reduced switching frequency variation, comprising:
   a pre-driver module configured to provide a drive signal based on a comparator signal;
   a power switch module configured to couple and decouple an unregulated input voltage to a first end of an inductor based on the drive signal to provide a regulated output voltage at a second end of the inductor;
   an integrator configured to integrate a voltage across the inductor to provide a ramp signal;
   a hysteretic comparator configured to compare the ramp signal with a reference signal to provide the comparator signal; and a frequency adjust controller configured to adjust a parameter of the integrator to maintain a frequency at which the power switch module couples and decouples the unregulated input voltage to the first end of the inductor.

2. The hysteretic switching regulator of claim 1, wherein the frequency adjust controller is configured to adjust the parameter of the integrator based on a change in the unregulated input voltage.

3. The hysteretic switching regulator of claim 1, wherein the frequency adjust controller is configured to adjust the parameter of the integrator based on which of several different possible voltage ranges the unregulated input voltage falls within.

4. The hysteretic switching regulator of claim 1, wherein the integrator includes a series coupled resistor and capacitor.

5. The hysteretic switching regulator of claim 4, wherein the parameter of the integrator is a resistance associated with the resistor.

6. The hysteretic switching regulator of claim 5, wherein the frequency adjust controller is configured to increase the resistance if the unregulated input voltage decreases and decrease the resistance if the unregulated input voltage increases.

7. The hysteretic switching regulator of claim 4, wherein the parameter of the integrator is a capacitance associated with the capacitor.

8. The hysteretic switching regulator of claim 7, wherein the frequency adjust controller is configured to increase the capacitance if the unregulated input voltage decreases and decrease the capacitance if the unregulated input voltage increases.

9. The hysteretic switching regulator of claim 1, further comprising a low pass filter configured to filter the ramp signal.

10. The hysteretic switching regulator of claim 1, wherein the hysteretic switching regulator is at least one of a buck, boost, and buck-boost switching regulator.

11. The hysteretic switching regulator of claim 1, wherein the frequency adjust controller is further configured to adjust a parameter of the integrator to maintain a frequency of the comparator signal within a desired frequency range.

12. A method for operating a hysteretic switching regulator to reduce switching frequency variation, comprising:
providing a drive signal based on a comparator signal;
coupling and decoupling an unregulated input voltage to a first end of an inductor based on the drive signal to provide a regulated output voltage at a second end of the inductor;
integrating a voltage across the inductor, using an integrator, to provide a ramp signal;
comparing the ramp signal with a reference signal to provide the comparator signal; and
adjusting a parameter of the integrator to maintain a frequency at which the unregulated input voltage is coupled and decoupled to the first end of the inductor.

13. The method of claim 12, wherein adjusting the parameter of the integrator further comprises:
adjusting the parameter of the integrator based on which of several different possible voltage ranges the unregulated input voltage falls within.

14. The method of claim 12, wherein adjusting the parameter of the integrator further comprises:
adjusting the parameter based on a change in the unregulated input voltage.

15. The method of claim 12, wherein the parameter of the integrator is a resistance.

16. The method of claim 15, wherein adjusting the parameter of the integrator further comprises:
increasing the resistance if the unregulated input voltage decreases; and
decreasing the resistance if the unregulated input voltage increases.

17. The method of claim 15, wherein adjusting the parameter of the integrator further comprises:
increasing the resistance if the unregulated input voltage transitions from a first voltage range to a second voltage range; and
decreasing the resistance if the unregulated input voltage transitions from the second voltage range to the first voltage range.

18. The method of claim 17, wherein the first voltage range includes voltage values that are greater than voltage values in the second voltage range.

19. The method of claim 12, wherein the parameter of the integrator is a capacitance.

20. The method of claim 19, wherein adjusting the parameter of the integrator further comprises:
increasing the capacitance if the unregulated input voltage decreases; and
decreasing the capacitance if the unregulated input voltage increases.

21. A hysteretic switching regulator with reduced switching frequency variation, comprising:
a pre-driver module configured to provide a drive signal based on a comparator signal;
a power switch module configured to couple and decouple an unregulated input voltage to a first end of an inductor based on the drive signal to provide a regulated output voltage at a second end of the inductor;
an integrator configured to integrate a voltage across the inductor to provide a ramp signal;
a hysteretic comparator configured to compare the ramp signal with a reference signal to provide the comparator signal; and
a frequency adjust controller configured to adjust a resistor of the integrator or a capacitor of the integrator to maintain a frequency at which the power switch module couples and decouples the unregulated input voltage to the first end of the inductor within a desired frequency range.

* * * * *